United States Patent [19]

Mauney

[11] Patent Number: 5,675,932
[45] Date of Patent: Oct. 14, 1997

[54] PLANT GROWING SYSTEM

[76] Inventor: Terry Lee Mauney, 25 Cross Ridge Ct., Germantown, Md. 20874

[21] Appl. No.: 745,314

[22] Filed: Nov. 12, 1996

Related U.S. Application Data

[63] Continuation of Ser. No. 305,995, Sep. 19, 1994, abandoned.

[51] Int. Cl.$^6$ ................................................. A01G 31/00
[52] U.S. Cl. ........................................................ 47/62; 47/17
[58] Field of Search ............................ 47/62 C, 62, 62 E, 47/17 FM, 17 RL, 28.1

[56] References Cited

U.S. PATENT DOCUMENTS

| | | | |
|---|---|---|---|
| 963,099 | 7/1910 | Wells | 47/28.1 |
| 2,889,664 | 6/1959 | Olshansky | 47/28.1 |
| 4,128,966 | 12/1978 | Spector | |
| 4,177,604 | 12/1979 | Friesen | 47/62 |
| 4,198,953 | 4/1980 | Power | 47/17 RL |
| 4,304,068 | 12/1981 | Beder | 47/28.1 |
| 4,316,347 | 2/1982 | Smith | |
| 4,543,744 | 10/1985 | Royster | |
| 4,567,690 | 2/1986 | Murrell | |
| 4,741,123 | 5/1988 | Gauthier | |
| 4,817,332 | 4/1989 | Ikeda et al. | |
| 5,001,859 | 3/1991 | Sprung | 47/17 EC |
| 5,101,593 | 4/1992 | Bhatt | |
| 5,216,836 | 6/1993 | Morris et al. | 47/62 |

FOREIGN PATENT DOCUMENTS

| | | | |
|---|---|---|---|
| 4229116 | 8/1992 | Japan | 47/62 |

*Primary Examiner*—Terry Lee Melius
*Assistant Examiner*—Joanne C. Downs
*Attorney, Agent, or Firm*—Dickstein Shapiro Morin & Oshinsky, LLP

[57] ABSTRACT

A mobile, enclosed plant growing apparatus including a plumbing/irrigation system and a method for using such. The plumbing/irrigation system includes a modularized reservoir system, light tight piping, growing buckets, risers and sprinklers. A liquid nutrient solution is pumped from the reservoir system, through the piping, into the buckets through the risers, exiting from the sprinklers. The plant growing apparatus is substantially environmentally isolated. The plant growing apparatus may include a light tight enclosure made of a tent-like material. Also, certain growth parameters may be electronically controlled so as to maximize the growth profiles of the plants. The parameters include levels of light, liquid solution, temperature, humidity and pH.

5 Claims, 12 Drawing Sheets

PLANT GROWING SYSTEM

This application is a continuation of application Ser. No. 8/305,995, filed Sep. 19, 1994, now abandoned.

BACKGROUND OF THE INVENTION

The present invention generally relates to an improved plant growing system. In particular, the invention is directed to providing a completely mobile, environmentally isolated growing chamber. More particularly, the invention is directed toward a growing chamber for use indoors, with a plumbing/irrigation system and electronic controls for monitoring and controlling certain environmental parameters within the growing chamber.

Prior art efforts have focused on portability and irrigation. Examples of prior art systems directed to portability include U.S. Pat. Nos. 5,101,593 (Bhatt), 4,316,347 (Smith) and 4,128,966 (Spector). Deficiencies exist in these prior art systems. U.S. Pat. No. 4,128,966 (Spector) lacks the volume for multiple plants and lacks any irrigation system. U.S. Pat. Nos. 5,101,593 (Bhatt) and 4,316,347 (Smith) disclose systems with rollers. However, both systems are manufactured using rigid, heavy material. Thus, while these systems may be portable, they are not mobile.

Prior art systems with irrigated growing chambers are shown in U.S. Pat. Nos. 5,101,593 (Bhatt), 4,741,123 (Gauthier), 4,567,690 (Murrell), 4,817,332 (Ikeda) and 4,543,744 (Royster). There are many problems with these systems. The system shown by U.S. Pat. No. 5,101,593 (Bhatt) has spray heads which are located above vertically stacked plant trays. The spraying of water may not be confined to the trays, resulting in a net loss of fluid in the irrigation system and an added cleanup time. The Bhatt system also lacks a modularized reservoir system and thus cannot be easily changed to accommodate different irrigation needs. The other cited references lack any form of spraying devices for watering plants.

SUMMARY OF THE INVENTION

The deficiencies in the prior art are alleviated to a great extent by the present invention, which includes a mobile and enclosed plant growing apparatus with growing buckets, a plumbing/irrigation system, risers and sprinklers for each growing bucket, and a modularized reservoir system.

The present invention may be used by home gardeners desirous of growing year round with predictable results; gardeners short on space, such as apartment dwellers; health conscious gardeners; biotechnical professionals conducting plant experimentation such as cloning; and, plant physiologists.

An object of the present invention is to provide a mobile plant growing apparatus which is environmentally isolated and contains a plumbing/irrigation system.

Another object of the present invention is to provide a mobile plant growing apparatus that is environmentally isolated and electronically controlled.

A further object of the present invention is to provide a method of growing plants within a mobile, environmentally isolated plant growing apparatus.

Another object of the present invention is to provide a method for enhancing the growth profiles of plants by optimizing certain growth parameters.

An advantage of the present invention is its modular design, which allows movement of the plant growing containers within the environmentally isolated enclosure. Movement of the containers may be desired to enhance pollination, to maximize plant yield, to cull out certain characteristics of the plants, and to present individual plants with different positions within the enclosure to ensure optimized growth potential.

Another advantage of the present invention is that it is a completely environmentally isolated chamber and certain environmental parameters can be controlled through electronic means, thereby enhancing the possibility of optimized plant growth within the chamber.

Another advantage of the present invention is that the plumbing/irrigation system utilizes a minimum of turns in the piping, thus decreasing the system pressure loss due to incremental pressure losses at the turns.

A further advantage of the present invention is the modularity of the reservoir system. The modularity allows for a maximized amount of liquid nutrient to be stored in a single location, reducing the number of times an operator must fill the reservoir tanks.

Another advantage of the present invention is its easy assembly, disassembly and/or cleaning. A preferred embodiment of the present invention can be assembled within one hour.

Other objects and advantages of the present invention will become apparent from the following description and drawings which illustrate preferred embodiments of the invention.

DETAILED DESCRIPTION OF PREFERRED EMBODIMENTS

Figure 1:
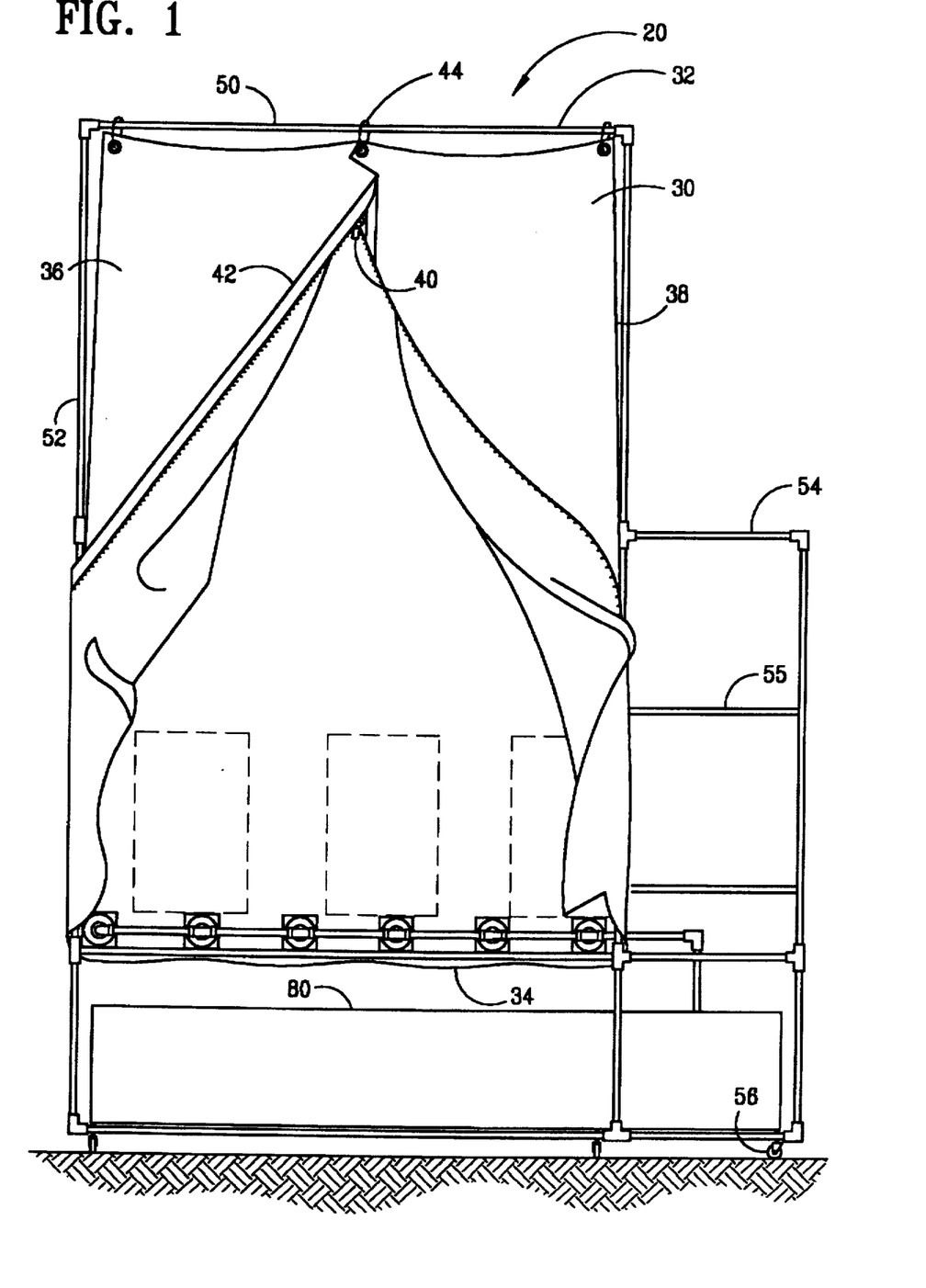
FIG. 1 is a perspective view of a portable growth chamber according to a preferred embodiment of the present invention.
Figure 2:
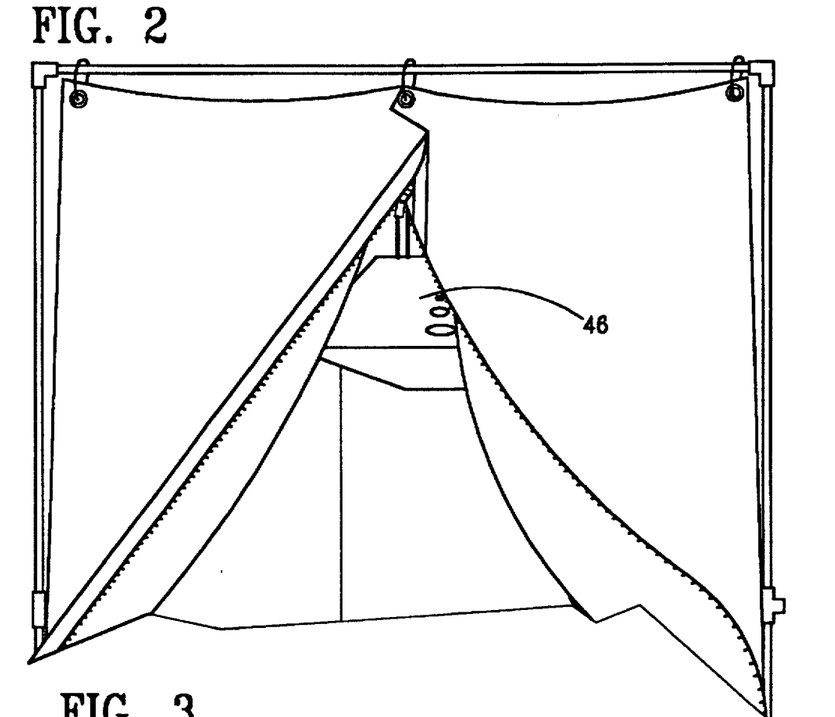
FIG. 2 is a view of the interior of the growth chamber of FIG. 1.
Figure 3:
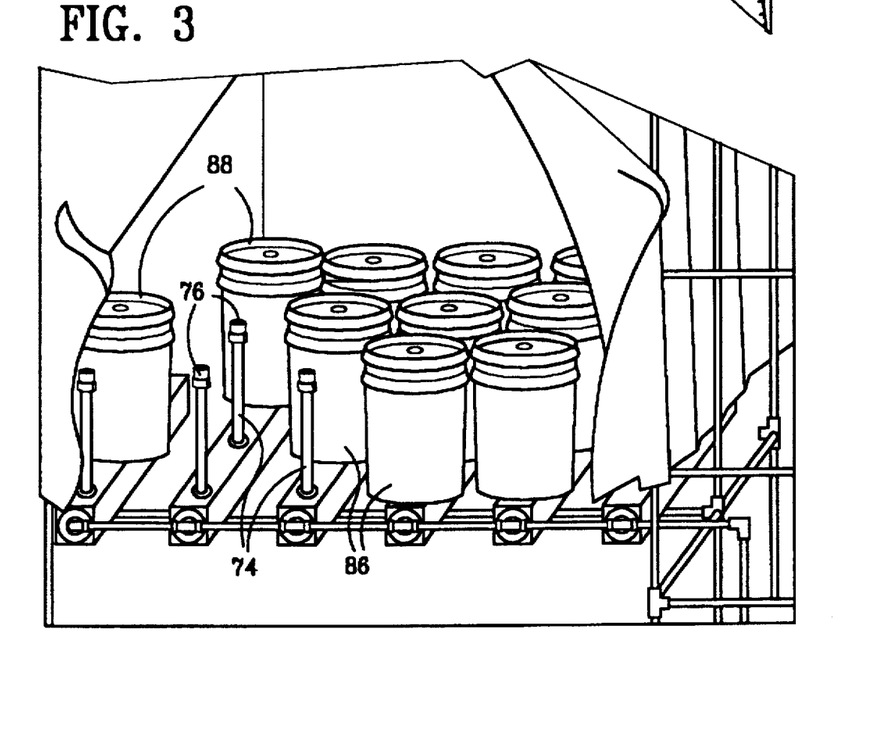
FIG. 3 is an enlarged front view of the chamber of FIG. 1.
Figure 4:
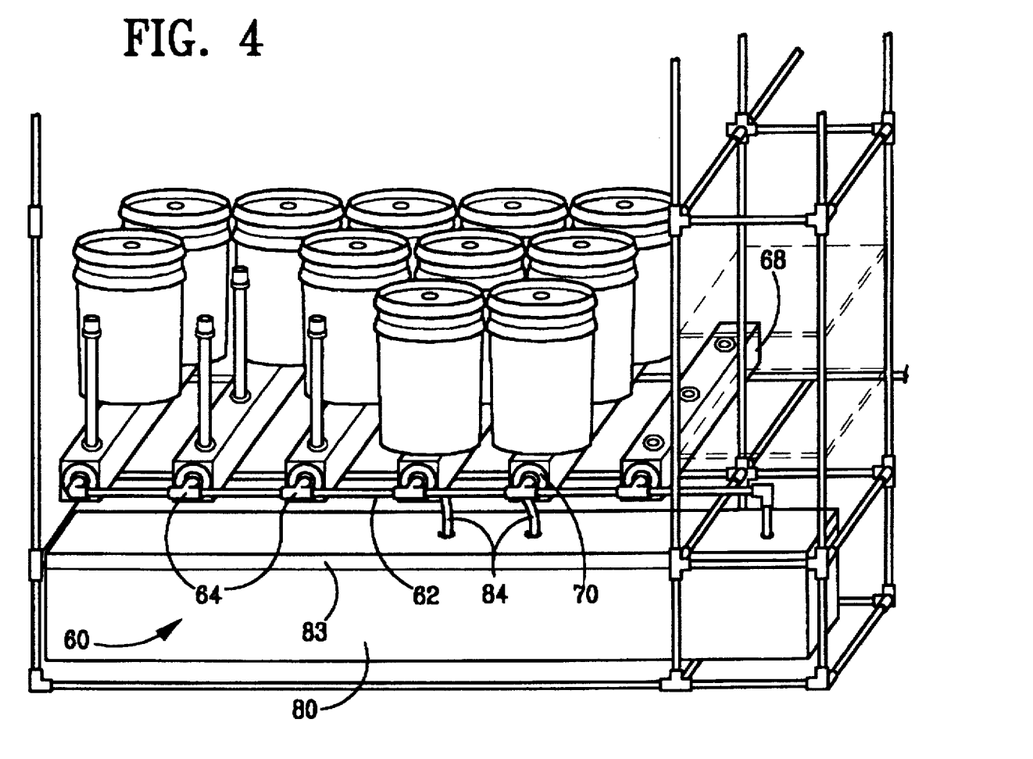
FIG. 4 is a perspective view of a plumbing/irrigation system for the chamber of FIG. 1.
Figure 5:
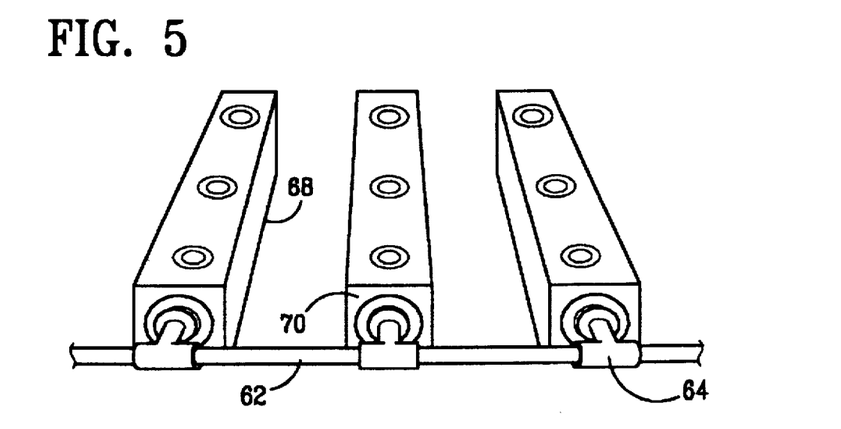
FIG. 5 is an enlarged front view of the plumbing/irrigation system of FIG. 4.
Figure 6:
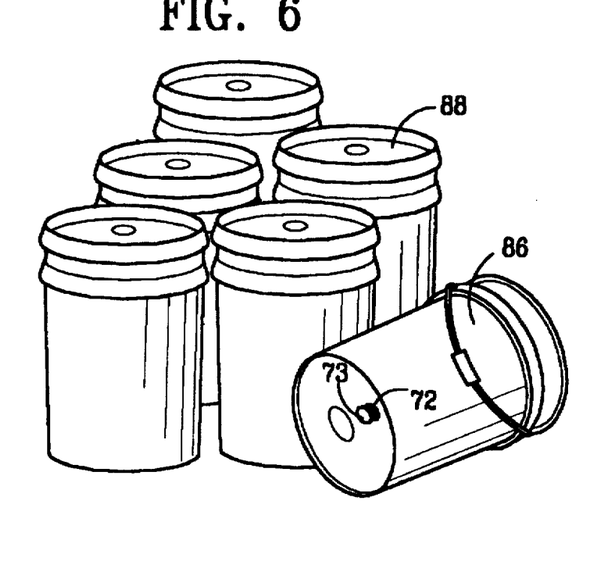
FIG. 6 is a perspective side view of a growing bucket.
Figure 7:
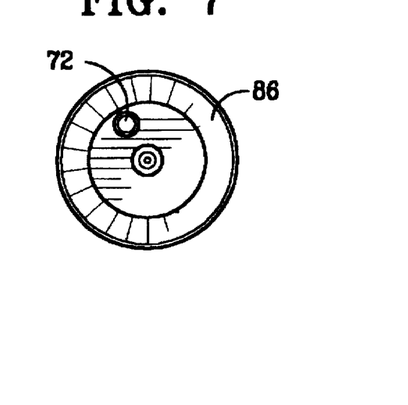
FIG. 7 is a top view of the growing bucket of FIG. 6.
Figure 8:
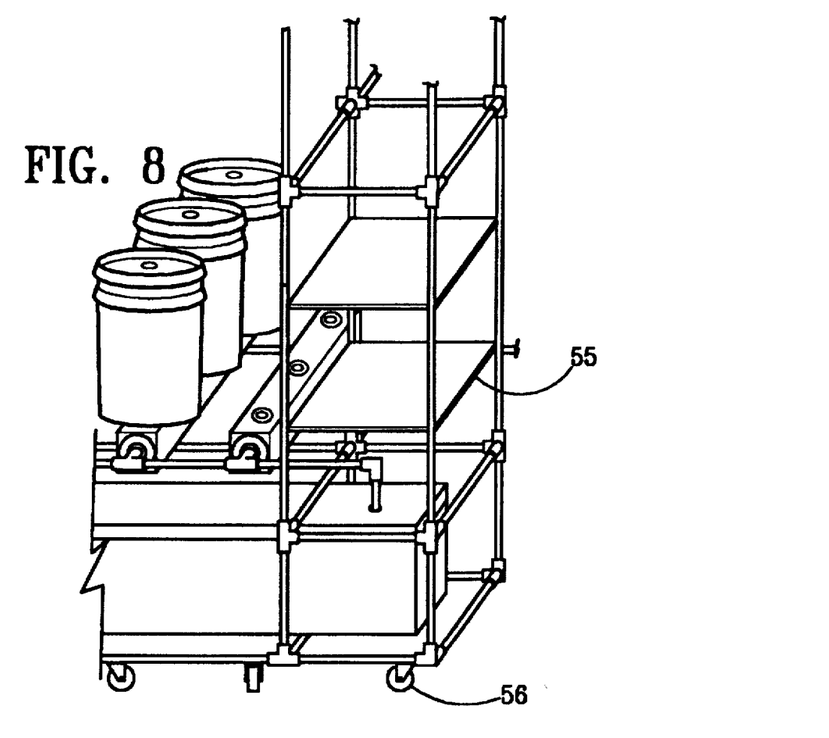
FIG. 8 is a perspective view of an outer portion of the growth chamber of FIG. 1.
Figure 11:
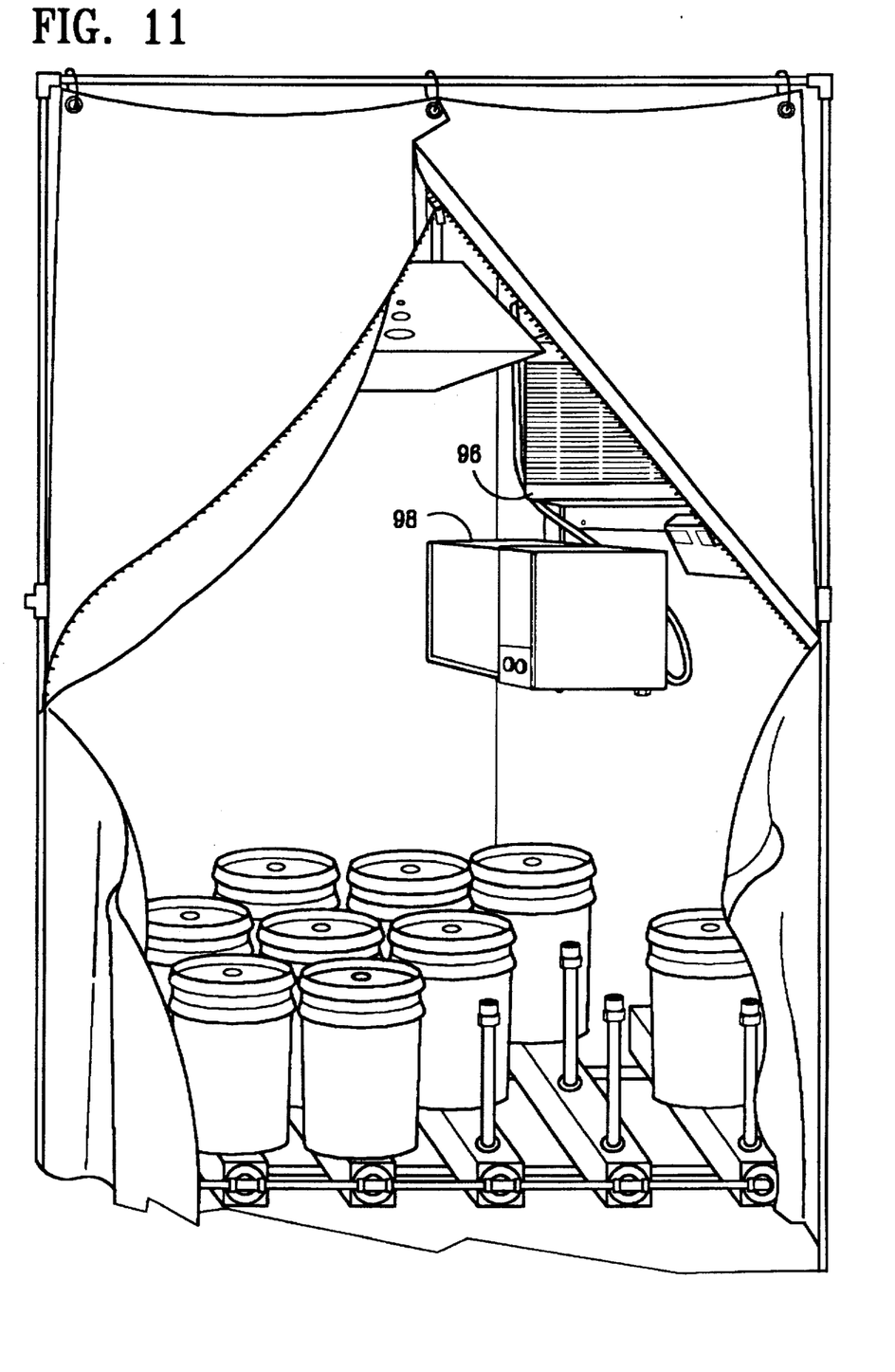
FIG. 11 is an interior view of the growth chamber of FIG. 1, showing a temperature control unit and a humidity control unit.

Referring now to the drawings, where like numbers indicate like elements, there is shown in FIGS. 1 and 11 a growth chamber 20. The preferred dimensions for the growth chamber 20 are approximately four feet wide by four feet deep by seven feet, ten inches tall. The chamber 20 is substantially rectangular in shape. The dimensions and shape of the chamber 20 are not, however, so limited. The chamber 20 comprises a tent-like structure 30 and a lightweight frame 50. The tent-like structure 30 may be made of a flexible, light tight material. An example of such a material is RIPSTOP® polyester vinyl. The structure 30 may comprise three layers of material, two white-colored layers sandwiching a black-colored layer. The three layers assist in making the chamber 20 light tight, while helping to prevent the growth of algae in the reservoir system (to be described in detail below). Furthermore, the tent-like material is durable and provides desirable heat transfer characteristics.

The lightweight frame 50 is preferably made of polyvinylchloride (PVC) tubing, more particularly one inch internal diameter PVC schedule 40 or schedule 80 pipe. The frame 50 may be held together by a number of different affixing means, such as pins or glue. However, the preferred embodiment is held together without such means. In the preferred embodiment, the frame 50 tubing fits within junction tubing. The tent-like structure 30 is then attached (to be described in detail below) to the frame 50 in numerous places. The pulling force directed from the tent-like structure 30 helps to maintain the frame 50 tubing snug within the junction tubing. By this way the frame 50 may be held together.

The tent-like structure 30 has a tent top 32, a tent floor 34, a tent front 36 and tent sides 38. A plurality of openings are located in the tent sides 38 to accommodate electric cords and various other connections to the outside environment. A plurality of openings are located in the tent floor 34 to receive drainage pipes (to be described in detail below).

Tent front 36 has an opening in it to allow easy access to the interior of the growth chamber 20. In addition, the base of tent front 36 may be attached to tent floor 34. Preferably, the opening in tent front 36 is a zipper 40; however, snaps, VELCRO brand hook and loop fasteners or other similar closure devices may be utilized. The base of tent front 36 may be attached to tent floor 34 by similar closure devices. Further, with regard to the opening and the base of tent front 36, a zipper 40 may be used in conjunction with any other similar closure device. In addition, suspending means 42 may be located on the tent front 36 to allow the tent flaps on either side of the zipper 40 to be hung up and out of the way to allow the operator easy access to the growth chamber 20. The suspending means 42 may be a VELCRO brand hook and loop fastener or any other similar device.

The lightweight frame 50 consists of a tent frame 52 and an accessory frame 54. The tent-like structure 30 is attached to tent frame 52 via tent fasteners 44. The accessory frame 54 receives various devices (to be described in detail below) for controlling certain parameters within the growth chamber. Casters 56 may be located at the base of the lightweight frame 50 to allow for easy mobility of the entire growth chamber 20.

The interior of the tent-like structure 30 includes a light source 46, a portion of the plumbing/irrigation system 60 and growing buckets 86. As shown in FIG. 11, the interior of the tent-like structure 30 may also receive temperature controls 96, preferably an air conditioner unit and humidity controls 98, preferably an ionizer.

The tent-like structure 30 is a substantially light tight enclosure. When the structure 30 is completely enclosed (i.e., the tent zipper 40 is actuated such that tent front 36 is closed), virtually no light from the outside filters into the interior of the structure 30. The purpose of preventing exterior light from entering the structure 30 is to ensure that the amount of light illuminating the interior of the structure 30 remains consistent and is easily controllable by an operator.

In another preferred embodiment of the present invention, a tent front 236 (not shown) is provided. Tent front 236 is substantially similar to tent front 36 but includes an additional, clear plastic sheet 237 located inwardly of the light tight material. Sheet 237 further includes an opener 40. The purpose of sheet 237 is to allow the operator to open the light tight material of tent front 236 and view the interior of chamber 20 without disturbing the environment therein.

The light source 46 can be of any desired wattage. Optimum lighting conditions for most plants is 30 watts per square foot. To approximate such lighting conditions, a 400 watt bulb may be used. Preferably, either a high press sodium bulb or a metal halide bulb may be used. The metal halide bulb is capable of illuminating the interior of chamber 20 with a larger portion of the light spectrum, thus approximating the lighting of the sun more closely than conventional lights. The lighting conditions within the structure 30 may be optimized by making the interior surfaces of the structure 30 white in color. The white color maximizes the reflectivity of the light emitted by the light source 46 from the interior walls of the structure 30 toward the plants. In this way, the light illuminating the interior of the structure 30 is optimized to enhance the lighting conditions for the plants located therein.

The light source 46 is connected to an outside electrical system through one of the openings in the tent sides 38 for receiving such connections. A power cord trunk 39 is provided at one of the openings in the tent sides 38 to provide a means for power to be input to the interior of chamber 20. It is envisioned that a standard household current of less than 15 amps will be sufficient for the present invention. Furthermore, a timer may be electronically connected to the light source 46 such that the light source 46 illuminates the interior of the structure 30 at particular and discrete intervals of time.

In another preferred embodiment of the present invention, a parabolic dish 220 may be positioned within the tent-like structure 30 near the tent top 32. Furthermore, the structure 30 may be formed such that the tent top 32 is likewise parabolic in shape to better receive the dish 220. The dish 220 attaches to the frame 50 through a hole within the tent top 32.

The dish 220 may be formed of a thin, PVC plastic, and for ease of mobility, assembly and disassembly, the dish 220 may be formed of a plurality of fitted pieces, preferably four pieces. The dish 220 may be reflective in nature, preferably by being white in color.

The light source 46 is positioned at the focal point of the dish 220 and the direction of illumination is upward toward the dish. The light from the light source 46 travels to and is reflected from the dish 220. Due to the positioning of the light source 46 at the focal point of the dish 220, the light rays are reflected in a vertically downward direction toward the plants. In this manner, the plants within the chamber 20 receive more evenly distributed and more focused light rays.

The plumbing/irrigation system 60, shown in FIGS. 1, 3–5 and 12–13, consists of a main pipe 62, "T" junctions 64, pipe channels 66, rectangular conduits 68, plugs 70 and 71, bucket openings 72, threaded nipples 73, risers 74, sprinklers 76, a pump 78, the modularized reservoir tank system 80 and the drainage pipes 84. All but the reservoir tank system 80 and the drainage pipes 84 are completely located within the tent-like structure 30.

The piping utilized in the plumbing/irrigation system 60 is preferably a lightweight, one inch internal diameter PVC piping, which assists in lessening the overall weight of the growth chamber 20. Additionally, it is desired that the piping used in the plumbing/irrigation system 60 be light tight. Light tight piping will assist in preventing algae growth throughout the system.

Figure 12:
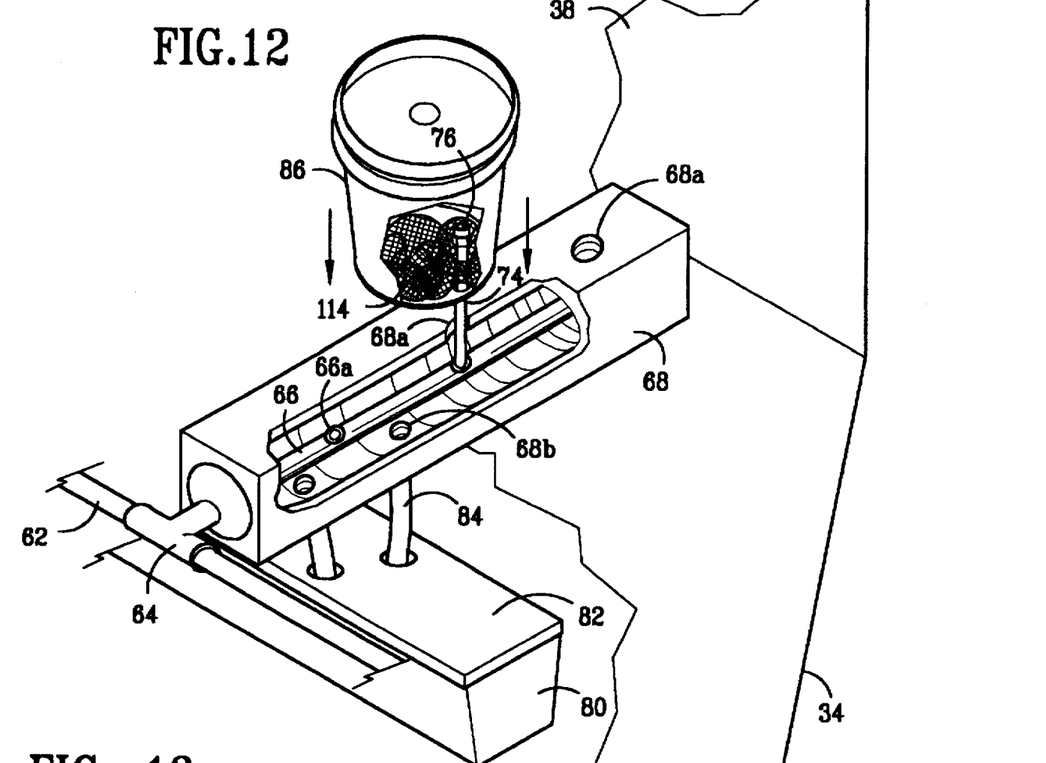
FIG. 12 is a partial cross-sectional view of the plumbing/irrigation system of FIG. 3.
Figure 13:
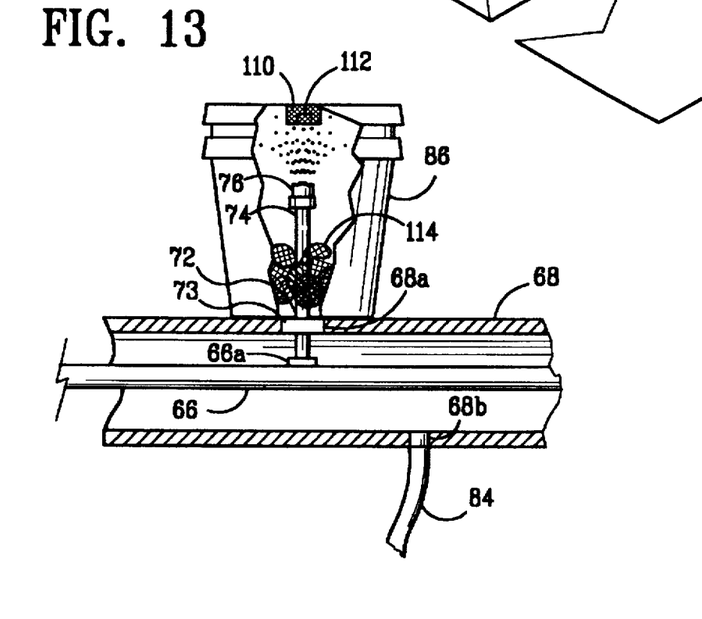
FIG. 13 is a partial cross-sectional view of the connection between the plumbing/irrigation system and the growing buckets of the chamber of FIG. 1.
Figure 14:
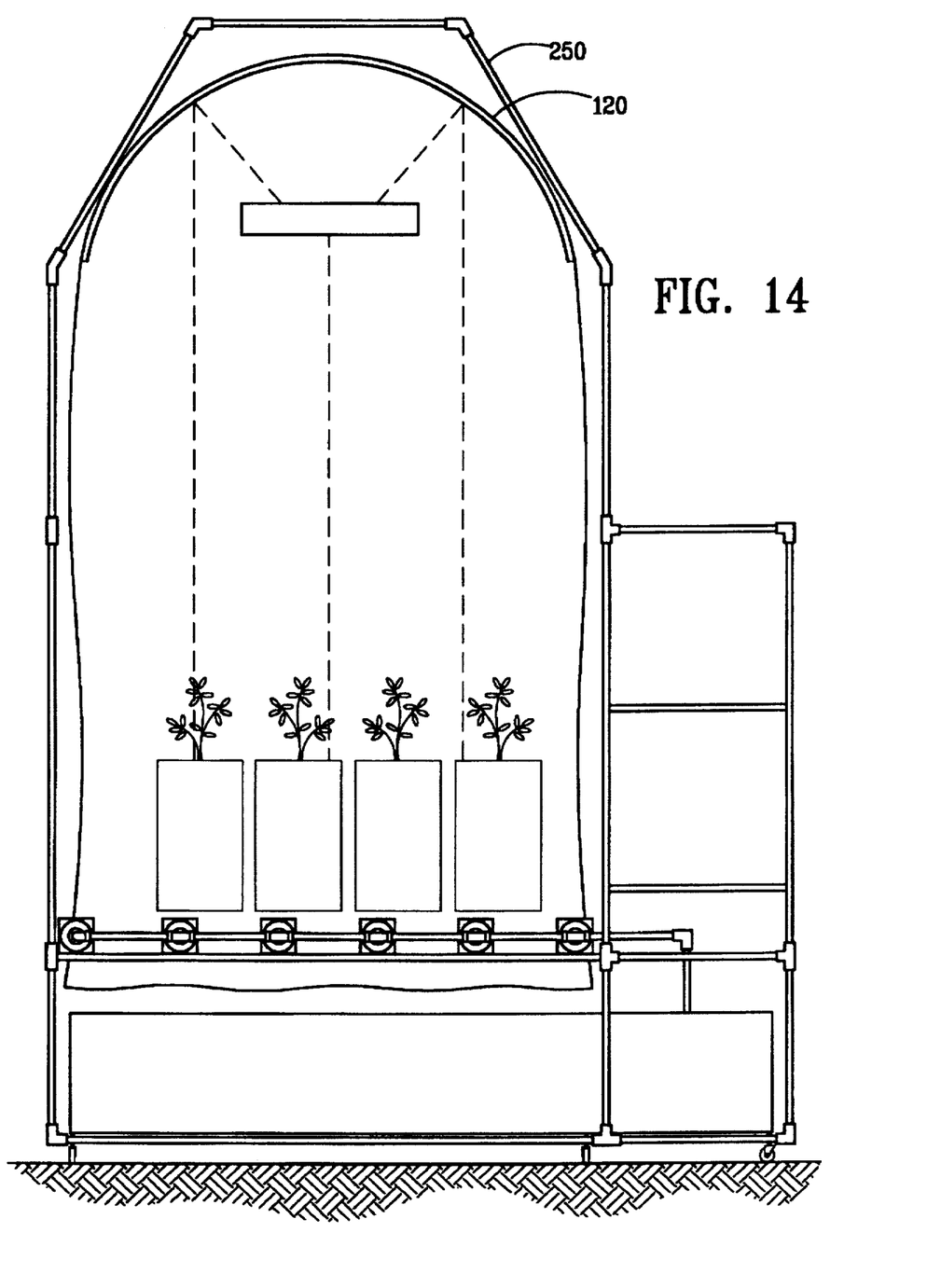
FIG. 14 is a perspective view of a portable growth chamber according to another preferred embodiment of the present invention.
Figure 15:
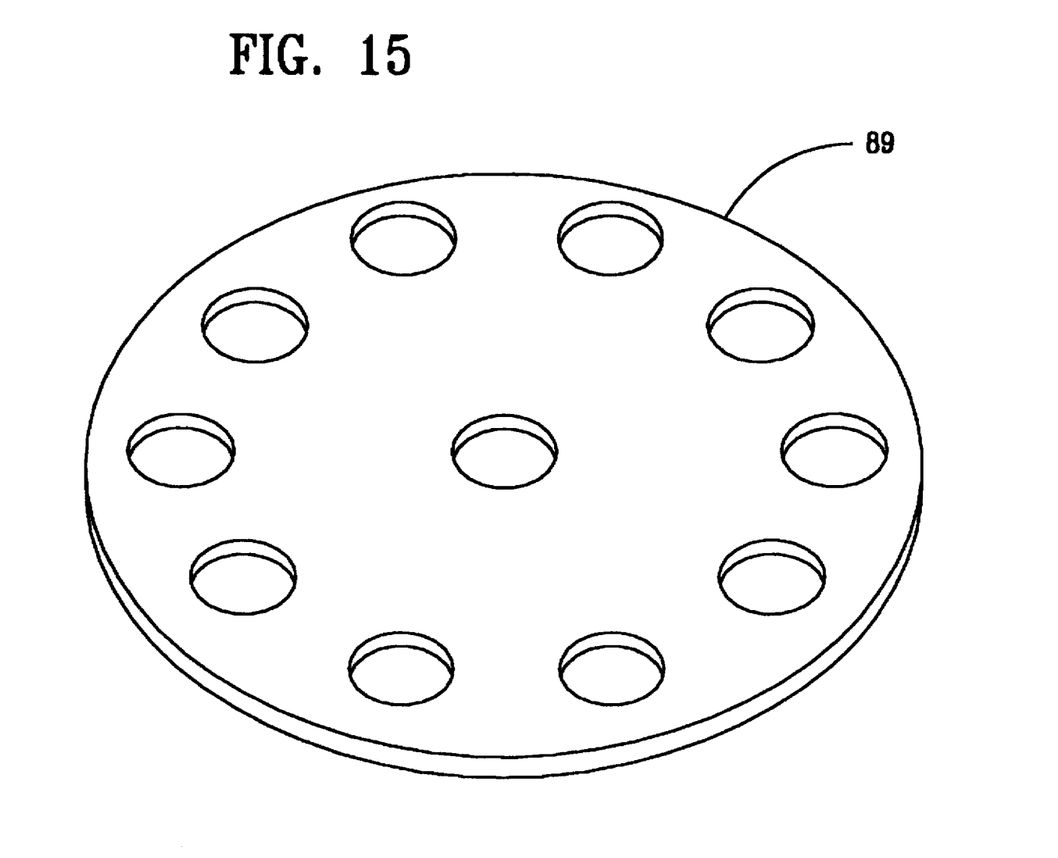
FIG. 15 is a perspective view of a cloning top for use with the growing bucket of FIG. 6.

The main pipe 62 connects the modularized reservoir tank system 80 with the remainder of the plumbing/irrigation system 60. The main pipe 62 leads up from the reservoir tank system 80 into the interior of the tent-like structure 30 through one of the holes located in the tent floor 34. The main pipe 62 then proceeds horizontally along the base of the tent front 36. "T" junctions 64 are located on the main pipe 62 at spaced intervals. The pipe channels 66 have a water tight connection to the "T" junctions 64, from which they lead in a direction substantially perpendicular to the main pipe 62. Thus, the pipe channels 66 proceed from the tent front 36 toward the rear of the growth chamber 20. Each pipe channel 66 has a plurality of pipe channel openings 66a located on a substantially upper surface of the pipe channel 66, as shown in FIGS. 12, 13. Top 83 (to be described in detail below) is not shown in FIG. 12 so that a view of nutrient solution 82 is provided.

Each pipe channel 66 is positioned within a rectangular conduit 68. The conduits 68 serve a dual purpose within the growth chamber 20. The conduits 68 rest upon the lightweight frame 50 substantially in the direction from the tent front 36 to the rear of the growth chamber 20 and act as a rest for the growing buckets 86. In addition to serving as a support for the growing buckets 86, the conduits 68 also perform a drainage function within the plumbing/irrigation system 60 (to be described in detail below).

Each conduit 68 has a plurality of upper surface openings 68a and lower surface openings 68b, as shown in FIGS. 12, 13. The upper surface openings 68a receive the threaded nipples 73, which in turn receive the risers 74. The nipples 73, which are preferably three inches in length and threaded throughout, are threadably connected to the upper surface openings 68a such that they can be tightened within one and a half turns. The risers 74, which are attached to the pipe channels 66 at the pipe channel openings 66a, rise up from the pipe channel openings 66a in a substantially vertical fashion. The risers 74 extend from the pipe channel openings 66a, through the nipples 73 and into the growing buckets 86, passing through bucket openings 72 which are located in the base of each growing bucket 86.

While it is possible to utilize soil for the plants within buckets 86, it is preferred that the plants be grown airoponically. Airponics is a completely soil-free method of growing whereby the root structure is suspended so that the roots are never completely flooded by water. In this way, the roots are always in an oxygen rich growing environment.

Each growing bucket 86 may have within it a growing support structure 114 through which the risers 74 extend and upon which plants may be deposited for growing. The support structure 114 may be a mesh material, made of inert plastic, with holes one-quarter inch in diameter. The structure 114 adds support to a fledgling plant root system as well as prevents the roots from being flooded. Growing root systems can entwine themselves in support structure 114. Additionally, the structure 114 assists in maintaining a humidity level within the growing buckets 86 as close as possible to one-hundred percent. Water input to the buckets 86 will move downwardly, due to gravity, eventually coming into contact with the structure 114. Because of its mesh design, the structure 114 has a relatively large surface area upon which water can cling due to the surface tension of the water.

The growing buckets 86 can be of any volume. A five gallon bucket is preferred for plants with extended root systems. Smaller buckets may be more appropriate for plants with less extensive roots. In addition, the buckets 86 are preferably black in color to prevent the growth of algae.

Figure 16:
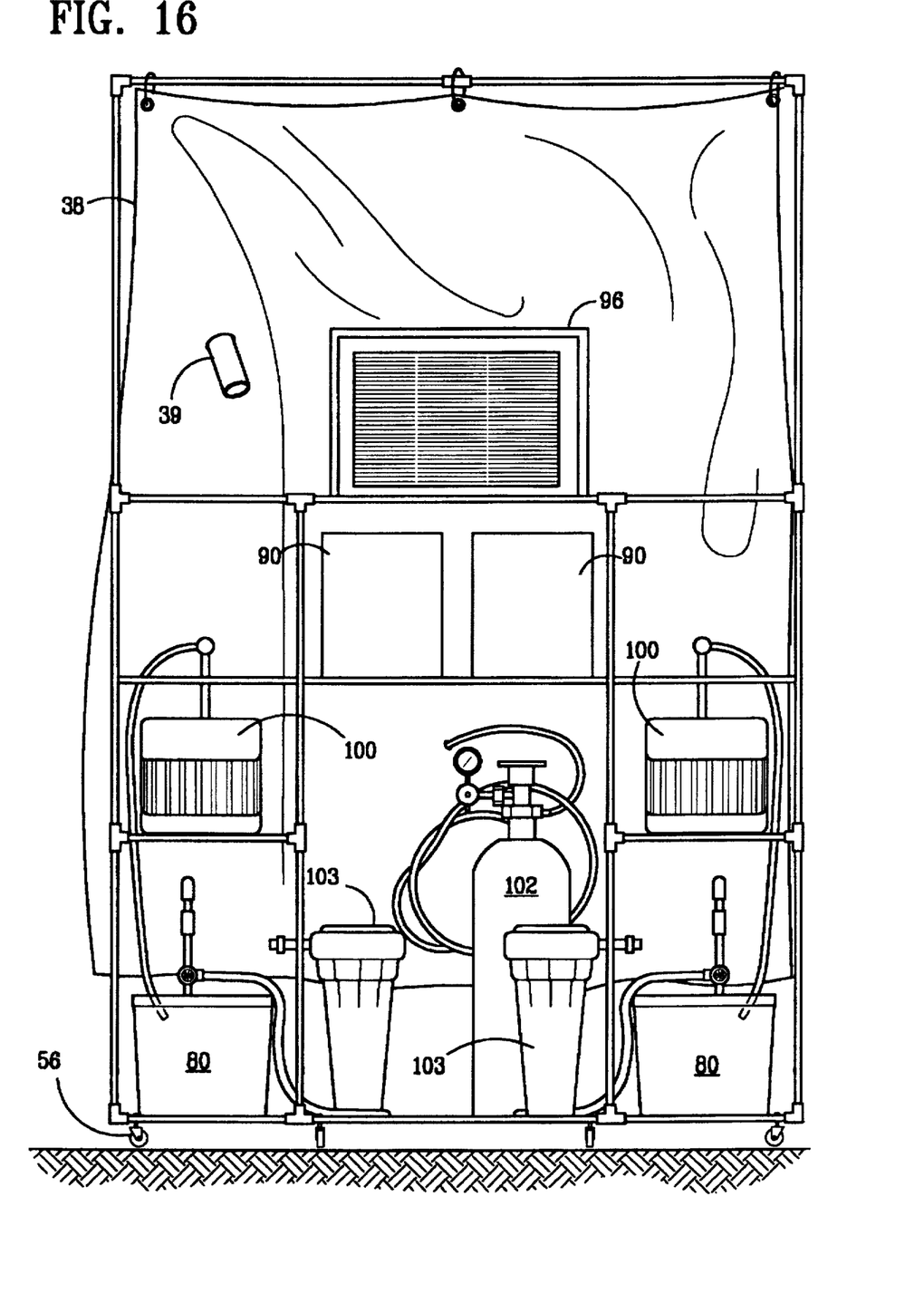
FIG. 16 is a side view of another preferred embodiment of the growth chamber of FIG. 1.

Each growing bucket 86 may be equipped with a either a bucket top 88 (as shown in FIGS. 3, 4, 6, 11 and 12) or a cloning top 89 (FIG. 16). The bucket top 88 fits tightly upon the top surface of the bucket 86, and has an opening, preferably two inches in diameter, within it. This top, which is for the growth of seedlings, is preferably white in color. Fitted within and underneath the opening is the net pot 110, within which may be positioned a cubed piece of rock wool 112. A plant seedling may be placed upon the rock wool 112, which is situated above the sprinkler 76. In addition to holding the rock wool 112, the net pot 110 assists in preventing water spray from the sprinkler 76 from exiting the bucket 86 through the top.

The cloning top 89 (FIG. 16) has a plurality of small openings and is sized such that it tightly fits within the bucket 86 at a level below the sprinkler 76. Net pots 110, together with rock wool cubes 112, are fitted within and underneath the openings located within the cloning tops 89. Instead of a root structure, plant cuttings are utilized in cloning procedures, and thus, the feeding of the plant occurs through the cutting, which may be placed upon the rock wool 112. The feeding of the cuttings is best accomplished by positioning the sprinkler 76 above the cuttings. The cloning tops 89 may be transparent or made of a white color to allow some light to filter through to the cuttings. A lid (not shown), again preferably transparent or white in color, may be placed over cloning top 89 to prevent water spray from the sprinkler 76 from exiting the top bucket 86.

In addition, in the case of more mature plants, it may not be necessary to utilize either of the tops 88, 89. Thus, the tops 88, 89 may be removed and placed to one side to allow maximum lighting for the plants deposited within the buckets 86.

Sprinklers 76 are received at the ends of the risers 74 located above the growing support structure 114 but within the growing buckets 86. While any form of sprinkler head may be utilized, it is preferred that the sprinkler 76 be formed of plastic. Water, or any other liquid nutrient solution, is sprinkled out of the sprinklers 76 above the growing support structure 114. Where seedlings are being grown, the water sprays up into the net pot 110 located on the underside of the opening within the top 88. In cloning operations, the water sprays down upon the cuttings positioned within the net pots 110 located on the underside of the openings within the top 89. In this way liquid sustenance is provided to the plants within the growing buckets 86. In addition, a substantially 100 percent humidity level may be maintained within the buckets 86, which is useful for enhancing the growth of plants. The positioning of the sprinklers 76 within the buckets 86 enables the sprinklers 76 to spray water upon the plant root system, with the tops 88 sealing the buckets 86, or cuttings with the tops 89 fitted within the buckets 86, without spraying the water outside of the buckets 86.

After watering the plants, any excess water not absorbed by the plant roots or adhering to the growing support structure 114 drains through the structure 114 and drains out of the growing buckets 86 through the bucket openings 72 and into the threaded nipples 73. The water travels through the nipples 73 and enters the rectangular conduits 68 through the conduit upper surface opening 68a. The water drains out of the conduits 68 through the conduit lower surface openings 68b and into the drainage pipes 84. Plugs 70, 71 are placed at either end of each rectangular conduit 68 to prevent water from exiting the conduits from the conduit ends. Plug 71 (not shown) is a standard square plug made of any suitable material and sized so as to completely enclose the opening of the conduit 68. Plug 70 is also a standard square plug of material, but it has a substantially circular opening, approximately one inch in diameter, so that it may receive the pipe channel 66 coming from the "T" junction 64. Preferably, plugs 70, 71 are made of PVC.

Figure 17:
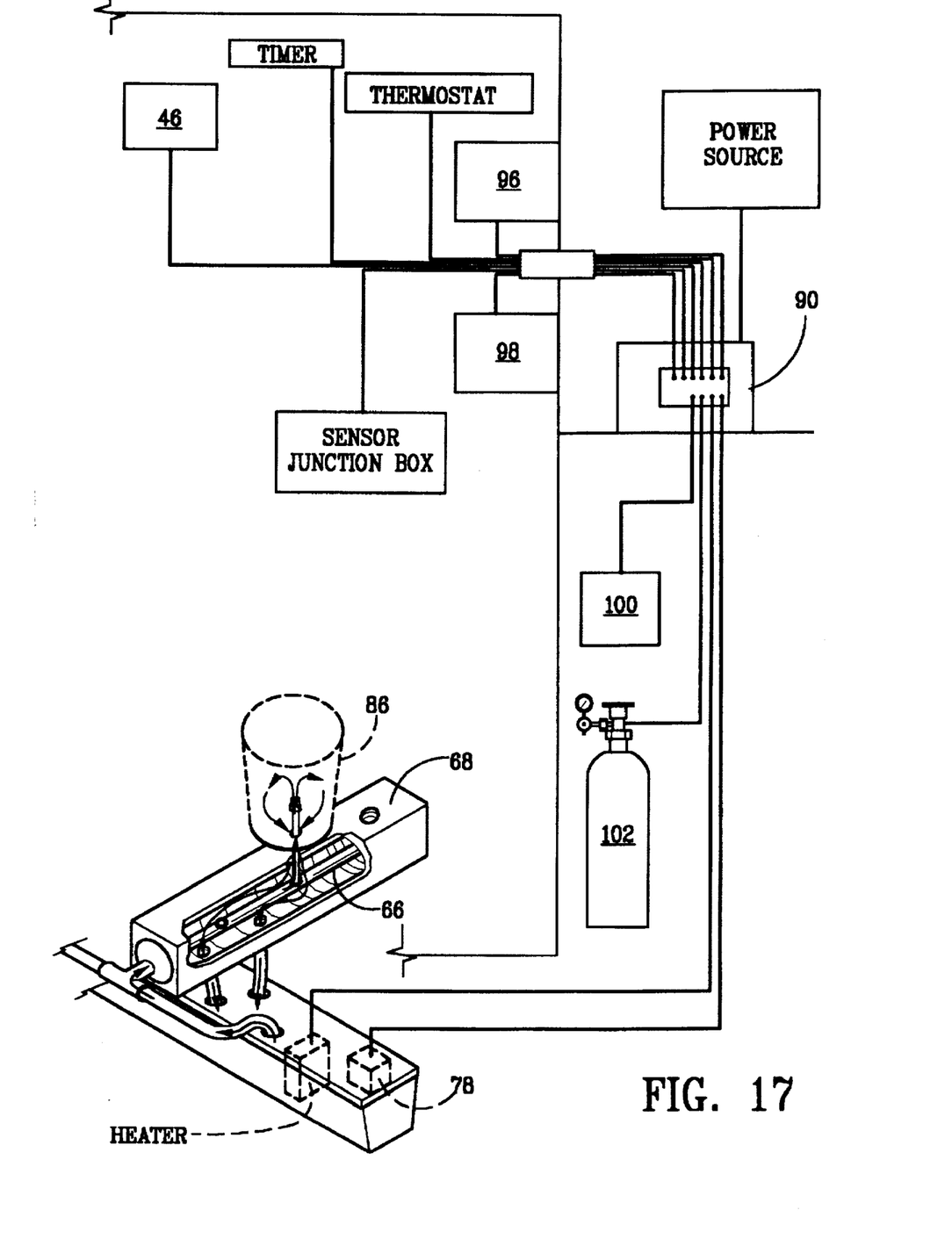
FIG. 17 is a flow diagram of a preferred embodiment of the growth chamber of FIG. 1.

The reservoir tank system 80 is located at the base of the growth chamber 20 underneath the tent floor 34. This arrangement saves space and also provides easy access to the reservoir tanks. Furthermore, tank system 80 includes tops 83 (FIG. 4) for each tank. The tops 83 make the tanks light tight, thus preventing the build-up of algae. Tops 83 include openings through which drainage pipes 84 and piping 60 may extend. Further, our opening is provided at an end to allow for changing out and replenishing the nutrient solution 82 therein. FIG. 17 is a flow diagram illustrating the flow of nutrient solution 82 through the present invention.

Figure 9:
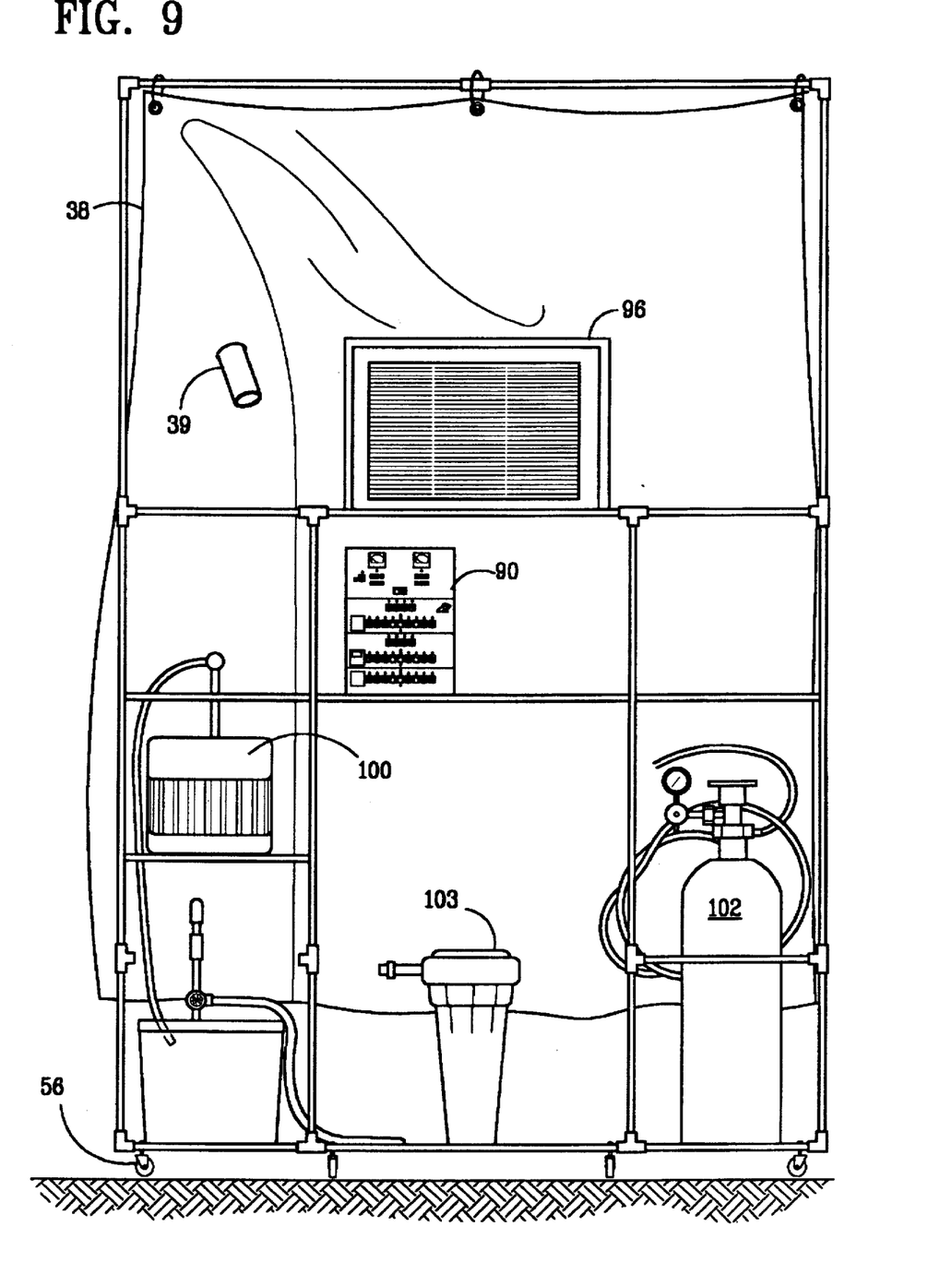
FIG. 9 is a side view of the outer portion shown in FIG. 8.

The reservoir tank system 80 is a modularized system. The modularity of the system 80 allows an operator to maximize the nutrient solution exchange/replenishment cycle by increasing the number of reservoir tanks to be utilized within the system 80 as shown in FIG. 16. In this manner, a operator can increase the amount of water or other nutrient solution available for the tent-like structure 30, thereby allowing for lengthened time intervals for replenishing the nutrient solution supplies. Further, a plurality of tanks allows one to utilize wholly different nutrient solutions. Because the feeding of the plants may be automated (to be described in detail below), the plants may be fed different solutions at precisely determined time intervals. A water filter 103 (FIG. 9) may be provided to ensure only properly filtrated water is used for the plant growing system.

The accessory frame 54, and more particularly the shelves 55, can be used to receive and support various devices and machines for controlling certain parameters within the tent-like structure 30 (as shown in FIGS. 1, 8 9, and 16). An important aspect of the present invention is that certain parameters vital for the growth of plants be substantially completely controllable. Of particular note are the parameters of water, light, temperature, humidity, pH, carbon dioxide and other nutrients.

Figure 10:
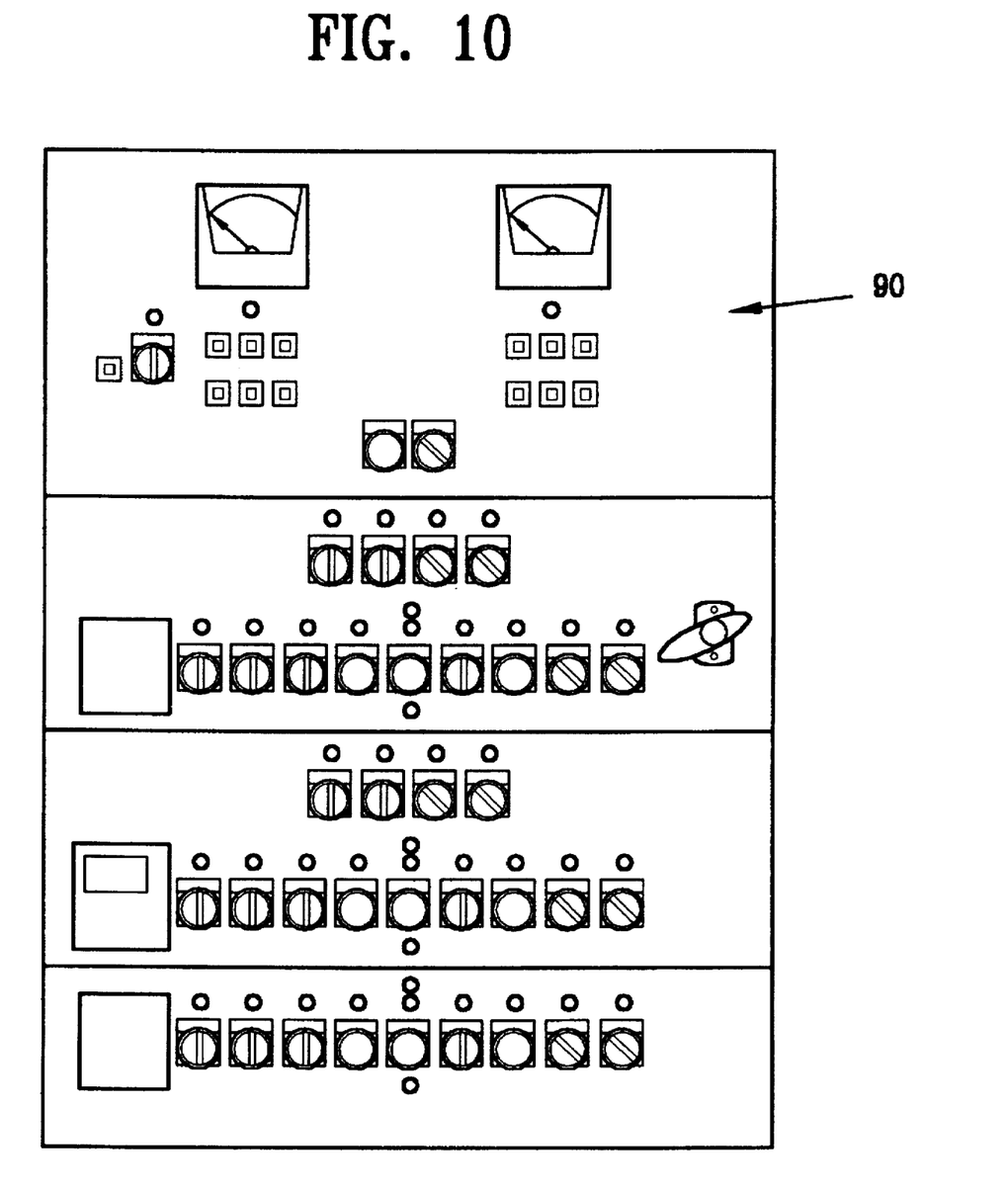
FIG. 10 is a front view of an electronic control box of the invention.

In addition to receiving various devices and machines for controlling the parameters, the accessory frame 54 may also house an electronic control system 90 (FIG. 10). The electronic control system 90 is connected to the various devices and machines to electronically control the various parameters within the tent-like structure 30. The electronic control system 90 may include water cycle controls 92, light cycle controls 94, temperature controls 96, humidity controls 98, pH controls 100, carbon dioxide controls 102 and other nutrient controls. Further, the control system 90 may be interfaced with a personal computer (PC). An appropriate parameter control software program, which can be loaded onto and accessed by the PC, may then be used in creating the controls desired regarding various plant growing parameters.

In operation, the pump 78 pumps a nutrient solution 82 from the modularized reservoir tank system 80 into the main pipe 62. The nutrient solution 82 then is fed from the main pipe 62 into the "T" junctions 64 which connect with the pipe channels 66. The pipe channels 66, which include pipe channel openings 66a, are located within rectangular conduits 68 which have upper surface openings 68a and lower surface openings 68b.

The nutrient solution 82 travels along the pipe channels 66 and up through the plurality of pipe channel openings 66a to which the risers 74 are connected. The risers 74 extend from the pipe channel openings 66a, through the conduit upper surface openings 68a, through the nipples 73 and openings 72 at the base of the growing buckets 86 and up through the growing support structure 114 within the buckets 86. The nutrient solution 82 exits the risers 74 through the sprinklers 76, which are located at the upward end of the risers 74. In this fashion, the nutrient solution 82 is sprinkled above the growing support structure 114 and within the growing buckets 86.

Excess nutrient solution 82 not absorbed by the plant root systems or clinging to the support structure 114 drains via gravity out the openings 72, through the nipples 73 and into the conduits 68. The nutrient solution then drains into the conduit lower surface openings 68b. Drainage pipes 84 are attached to the openings 68b by way of, preferably, threaded portions similar to the threaded nipples 73 described above. The pipes 84 lead back to the modularized reservoir tank system 80. Plugs 70, 71 at either end of each conduit 68 prevent the nutrient solution 82 from leaving the conduits in any other way other than the lower surface openings 68b. With this arrangement, the nutrient solution 82 within the reservoir tank system 80 is optimally utilized.

The electronic control system 90 may be preprogrammed to monitor and control a discrete set of growth parameters so as to enhance the growth profiles of the plants located within the growth chamber 20. For example, a water level sensor (such as a float) may be included within the modularized reservoir tank system 80. This sensor may be attached electronically to the electronic control system 90 such that when the water level within the reservoir tank system 80 reaches a preset level, an alarm will go off signifying to the operator that more nutrient solution 82 needs to be added to the reservoir tank system 80.

Similarly, light cycle controls 94 may be connected to the electronic control system 90. Preferably, the light cycle controls 94 include a timer and/or a rheostat. The timer may limit, as well as sequence, the amount of time that the light source 46 illuminates the interior of the tent-like structure 30. The rheostat may be utilized to decrease the wattage of the light illuminating the interior of the growth chamber 20. Both the timer and the rheostat may be connected to the electronic control system 90.

The temperature within the growth chamber 20 may also be controlled with the electronic control system 90 and the temperature controls 96, which preferably include an air conditioner unit (FIG. 11) and a thermostat. The thermostat monitors the temperature inside the tent-like structure. A plurality of temperature probes may be placed within the tent-like structure to sense the temperature therein. When the thermostat reads a preset temperature value, it actuates the air conditioner unit, through the electronic control system 90, either on or off. In a similar manner, the temperature of the nutrient solution may be controlled.

Humidity levels may similarly be manipulated by the electronic control system 90 and the humidity controls 98 so as to enhance the growth profiles of the plants. Humidity levels may be monitored by sensors which are electronically connected to the electronic control system 90.

The pH level of the nutrient solution 82 may be similarly controlled by control system 90 and pH controls 100. Sensors electronically connected to the control system 90 signal when pH levels indicate the need for addition of an acid solution to the nutrient solution 82. The pH controls 100 preferably include a pH adjustment feed for adding the acid solution to the nutrient solution 82.

Carbon dioxide ($CO_2$) controls 102 may include a $CO_2$ injection system including a $CO_2$ tank and a regulator. The operator may ascertain the $CO_2$ requirements for the chamber 20 and set the regulator to provide a rate of infusion of $CO_2$ into the chamber to maintain the predetermined level. The $CO_2$ controls 102 further may be connected to the electronic controls system 90.

FIG. 17 is a flow diagram illustrating the electrical flow within the present invention. Other plant growing parameter controls may be included within the present invention. Other parameters may include nitrogen levels, phosphorous levels and micro-nutrient levels.

The present invention should not be limited to the above-described preferred embodiments. The invention is defined by the appended claims. What is new and deemed to be protected by Letters Patent of the United States is:

I claim:

1. A plant growing system comprising:

a growing bucket for receiving a plant, said bucket having a base opening;

an environmentally isolated chamber, said bucket being located within said chamber;

an irrigation system including a riser and a sprinkler, said riser rising upwardly through said base opening, said sprinkler located within said bucket at an upper end of said riser; and a plumbing system connected to a lower end of said riser, said plumbing system causing liquid nutrient solution to flow through said riser, then through said sprinkler and then onto said plant.

2. A plant growing system according to claim 1, wherein said chamber includes a tent-like structure and a lightweight frame.

3. A plant growing system according to claim 2, wherein said chamber includes a parabolic dish.

4. A plant growing system according to claim 2, further comprising means for electronically controlling environmental parameters within said chamber.

5. A plant growing system according to claim 4, wherein said means for electronically controlling includes means for controlling illumination, said liquid nutrient solution, temperature, humidity, pH and carbon dioxide.

* * * * *